Oct. 12, 1926.

G. MIDBOE

BUMPER

Filed Sept. 4, 1925

1,602,922

INVENTOR
GABRIEL MIDBOE
BY
Redding, Greeley, O'Shea & Campbell
ATTORNEYS

Patented Oct. 12, 1926.

1,602,922

UNITED STATES PATENT OFFICE.

GABRIEL MIDBOE, OF BROOKLYN, NEW YORK, ASSIGNOR TO INTERNATIONAL MOTOR COMPANY, OF NEW YORK, N. Y., A CORPORATION OF DELAWARE.

BUMPER.

Application filed September 4, 1925. Serial No. 54,419.

This invention relates broadly to devices adapted to receive impact and cushion the shock thereof. More particularly the invention relates to a bumper for motor vehicles and has for its particular object to provide a simple and practical cushion connection for the bumper with the vehicle frame. To this end yielding non-metallic material is operatively interposed as a cushioning connection and support between an element of the bumper and an element of the vehicle frame with provision for distortion of the rubber under impact conditions. More particularly annuli of rubber are interposed upon opposite sides of an abutment carried with the vehicle frame and are operatively connected with the bumper through the instrumentality of a bolt passing through the annuli and through an aperture in the abutment to maintain the rubber under an initial compression. Preferably the apertures in the annuli are tapered to facilitate the distortion of the rubber. In order that the invention may be clearly understood and readily carried into effect the same will now be described more particularly with reference to the accompanying drawings illustrating a preferred embodiment thereof, in which:

Figure 1:
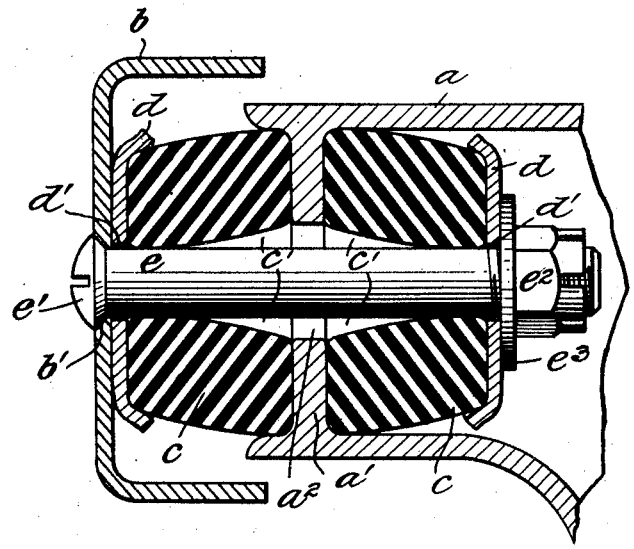
Figure 1 is a vertical sectional view of the cushion connection and support between the vehicle frame and the bumper taken in the plane indicated by the line 1—1 in Figure 2 and looking in the direction of the arrows.
Figure 2:
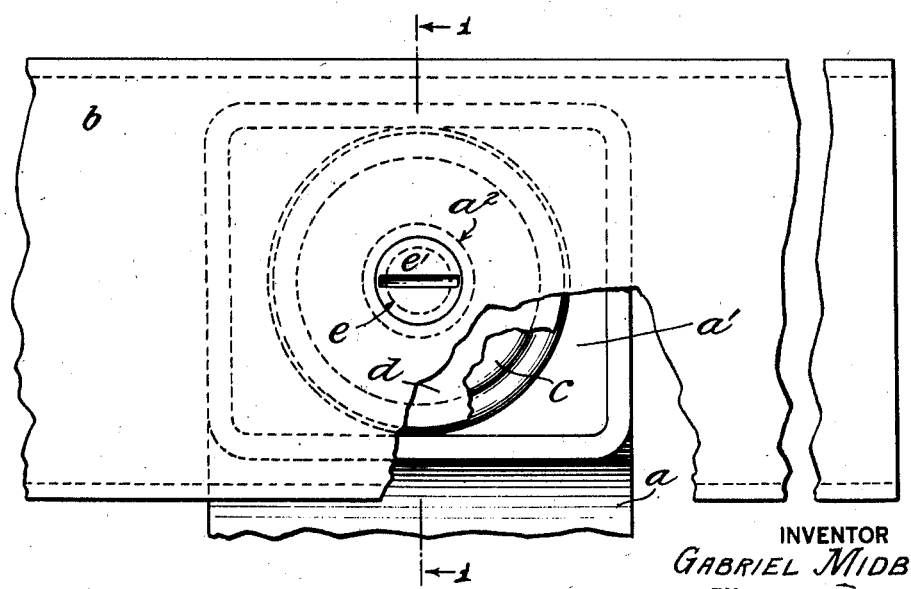
Figure 2 is a front view showing a fragmentary portion of the bumper and its manner of support from the vehicle frame.

A fragmentary portion of the vehicle frame is indicated at $a$ and a bumper $b$ is supported therefrom and adapted to extend transversely of the front of the vehicle. The chassis frame which may be considered as a base or support for the bumper is formed with an abutment $a'$ having formed therein a circular aperture $a^2$. Disposed upon either side of the abutment $a'$ are frusto-conical cushions $c, c$, of yielding non-metallic material, such as rubber, formed with a tapering passage $c'$. The bases of the annuli are disposed adjacent the abutment $a'$ and the opposite faces thereof are engaged by saucer-shaped seats $d$ formed with circular apertures $d'$ substantially the same or of less diameter than the aperture $a^2$ but of a diameter substantially equal to the smallest diameter of the passages $c'$. Passing through a countersunk hole $b'$ in the bumper is a bolt $e$ preferably formed with a slotted head $e'$. This bolt passes through the apertures $d'$ and $a^2$ and the passages $c'$ in the rubber cushions and is adapted through the instrumentality of the nut $e^2$ and, if desired, washer $e^3$ to maintain the non-metallic cushions under an initial compression. By so maintaining the cushions under internal static pressure the strength, resiliency and wearing qualities of the cushions are increased.

By the construction disclosed a wholly non-metallic mechanical connection and support is afforded for the bumper from the chassis frame which cushions the shocks and stresses impressed upon the bumper and prevent in whole or in part their transmission to the vehicle frame. By the provision of the tapered passages $c'$ and the enlarged aperture $a^2$ distortion of the rubber is permitted in the absorption of shock and some relative movement of the bumper is afforded. In some situations it may be found desirable to dispense with the saucer-shaped seats $d$ although it will be found that these contribute to the positioning of the rubber annuli and the maintenance thereof under internal static pressure.

Various modifications may be made in the disposition and configuration of the component elements going to make up the shock insulating device according to the present invention without departing from the spirit and scope of the invention.

What I claim is:

1. In a device of the character described, in combination, a base element, a bumper element, and a non-metallic mechanical cushion and support between said elements comprising an annulus of yielding non-metallic material between said elements, and means to retain said element therebetween.

2. In a device of the character described, in combination, a base element formed with an aperture, a bumper element formed with an aperture of less diameter than the first named aperture and a non-metallic mechanical cushion and support between said elements comprising an annulus of yielding non-metallic material having a tapering aperture disposed between said elements, and means to retain said annulus in position, 3. In a device of the character described, in combination, a base element formed with an aperture, a bumper element formed with an aperture of less diameter than the first named aperture, a non-metallic mechanical cushion and support between said elements comprising annuli of yielding non-metallic material formed respectively with tapering apertures disposed upon opposite sides of the base element, and a bolt passing through the apertures.

4. In a device of the character described, in combination, a base element formed with an aperture, a bumper element formed with an aperture of less diameter than the first named aperture, a non-metallic mechanical cushion and support between said elements comprising annuli of yielding non-metallic material formed respectively with tapering apertures disposed upon opposite sides of the base element, and a bolt passing through the apertures to retain said material under compression.

5. In a device for cushioning shocks, an apertured base member forming back to back seats on either side of the member, cushion elements seated in the seats, washers forming seats for the outer ends of the cushions, a bumper member and means passing through the cushions and aperture to secure all of said elements together.

6. In a device for cushioning shocks, a base member comprising an apertured portion and outwardly extending flanges whereby back to back seats are formed, hollow yielding non-metallic cushioning devices disposed in the seats, seats for the outer ends of the cushions, a shock receiving member and means passing through all of said members and the aperture for securing them in assembled position.

7. In a device for cushioning shocks, a hollow, outwardly extending bracket having an inwardly extending apertured flange on the walls near the outer end of the bracket whereby back to back seats are provided by the walls on opposite sides of the flange, inner and outer cushion members in the seats, apertured seats for the outer ends of the members, a shock receiving element and a bolt passing through all of said members for securing the element to the outer end of the outer cushion.

8. In a device for cushioning shocks, a hollow, outwardly extending bracket having an inwardly extending apertured flange on the walls near the outer end of the bracket whereby a section through the flange, bracket, and aperture resembles back to back channels, thus forming seats in the channels, inner and outer yielding non-metallic cushion members resembling a hollow frustum of a cone in the seats, seats for the outer ends of the cushions, apertured to aline with the first aperture and the hollow portions of the seats, a shock receiving member and means passing through the alined openings and last named members for securing the latter in shock receiving position on the outer end of the outer cushion.

This specification signed this 1st day of Sept. A. D. 1925.

GABRIEL MIDBOE.